(12) United States Patent  
Hu

(10) Patent No.: US 7,962,896 B2  
(45) Date of Patent: Jun. 14, 2011

(54) METHOD AND SYSTEM FOR AUTOMATICALLY CONFIGURING SOFTWARE

(75) Inventor: Michael Noel Hu, Langley (CA)

(73) Assignee: Eazypaper Inc., Calgary AB (CA)

( * ) Notice: Subject to any disclaimer, the term of this patent is extended or adjusted under 35 U.S.C. 154(b) by 1195 days.

(21) Appl. No.: 11/262,649

(22) Filed: Oct. 31, 2005

(65) Prior Publication Data

US 2007/0100969 A1 May 3, 2007

(51) Int. Cl.  
*G06F 9/44* (2006.01)  
*G06F 15/16* (2006.01)  
*G06F 15/177* (2006.01)

(52) U.S. Cl. ......... 717/121; 717/170; 709/202; 709/221

(58) Field of Classification Search .................. None  
See application file for complete search history.

(56) References Cited

U.S. PATENT DOCUMENTS

| | | | |
|---|---|---|---|
| 7,047,277 B1* | 5/2006 | Welter et al. ................. | 709/203 |
| 7,054,924 B1* | 5/2006 | Harvey et al. ................. | 709/220 |
| 7,191,324 B2* | 3/2007 | Machida ........................ | 713/1 |
| 7,395,322 B2* | 7/2008 | Harvey et al. ................. | 709/220 |
| 7,467,141 B1* | 12/2008 | Steele et al. .................. | 1/1 |
| 7,487,204 B2* | 2/2009 | Asthana et al. ............... | 709/203 |
| 7,840,637 B2* | 11/2010 | Adelman et al. .............. | 709/204 |
| 2002/0017557 A1* | 2/2002 | Hendrick ....................... | 235/380 |
| 2003/0055928 A1* | 3/2003 | Machida ........................ | 709/222 |
| 2003/0140333 A1* | 7/2003 | Odaka et al. .................. | 717/115 |
| 2005/0080882 A1* | 4/2005 | Philyaw et al. ............... | 709/220 |
| 2005/0160420 A1* | 7/2005 | Kruta et al. ................... | 717/174 |
| 2005/0240664 A1* | 10/2005 | Chen et al. .................... | 709/220 |
| 2006/0190575 A1* | 8/2006 | Harvey et al. ................. | 709/222 |
| 2007/0005649 A1* | 1/2007 | Wang et al. ................... | 707/104.1 |
| 2008/0052668 A1* | 2/2008 | Craig et al. ................... | 717/111 |
| 2008/0091614 A1* | 4/2008 | Bayod et al. .................. | 705/71 |
| 2010/0064208 A1* | 3/2010 | Valtchev ....................... | 715/234 |
| 2010/0262678 A1* | 10/2010 | Morgan et al. ................ | 709/220 |

FOREIGN PATENT DOCUMENTS

| | | |
|---|---|---|
| CA | 2335298 A1 | 12/1999 |
| CA | 2287013 A1 | 4/2000 |

OTHER PUBLICATIONS

Microsoft Corporation, Configuring Remote Desktop [online], Nov. 3, 2005 [retrieved on Jan. 26, 2011], pp. 12, Retrieved from the Internet: <http://technet.microsoft.com/en-us/library/bb457106(printer).aspx>.*

Adam Baratz, Windows desktop search tools [online], Apr. 4, 2005 [retrieved on Jan. 26, 2011], p. 1, Retrieved from the Internet: <http://arstechnica.com/old/content/2005/04/desktop-search.ars>.*

* cited by examiner

*Primary Examiner* — Tuan Q Dam  
*Assistant Examiner* — Hanh T Bui  
(74) *Attorney, Agent, or Firm* — Chen Yoshimura LLP

(57) ABSTRACT

A method and system for automatically configuring software distributed through a network. A server of the software vendor gathers certain information such as the user's name during a software download or purchase process, and generates a custom webpage containing software configuration information and/or a user id. The software being distributed includes an automatic configuration program. When the software is launched, the automatic configuration program finds the custom webpage and scrapes the necessary configuration information from it. The automatic configuration program then automatically configures the downloaded software using the configuration information. The automatic configuration program may also obtain additional configuration information from the server using the id contained in the custom webpage.

5 Claims, 1 Drawing Sheet

METHOD AND SYSTEM FOR AUTOMATICALLY CONFIGURING SOFTWARE

BACKGROUND OF THE INVENTION

1. Field of the Invention

This invention relates to configuring software for users, and in particular, it relates to a method and system of configuring software without recompiling or customizing it for every user.

2. Description of the Related Art

Most software requires some type of configuration by the user which requires the user to provide certain information, such as specifying an install directory, a license code, a user name, or which components to install. Existing solutions are costly to deploy and/or error prone for the user, often causing user frustration and increased technical support costs.

There are two classes of commonly used conventional configuration schemes. In the first conventional scheme, the user manually configures the software. This is usually done during the installation process. The user is expected to set the installation directory, provide the user name, and in some instances choose which software modules to install. Users often do not understand these configuration options, and manually entering them is confusing and error prone. In the second conventional scheme, the configuration options are compiled into the software. There are several variants of this approach and many of them are patented Canada patents 2287013 and 2335298, especially for anti-piracy applications. Custom compiling, or preconfiguring a software build for a specific user, dramatically increases software distribution cost and complexity.

SUMMARY OF THE INVENTION

Accordingly, the present invention is directed to a method and system of configuring software that substantially obviates one or more of the problems due to limitations and disadvantages of the related art.

An object of the present invention is to automate software configuration processes.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method of automatically configuring software program distributed to a user, which includes transmitting the software program to the user's computer; obtaining configuration information from the user; generating a custom webpage containing the configuration information obtained from the user and transmitting the custom webpage to the user's computer; and providing an automatic configuration program as a part of the software program transmitted to the user's computer, the automatic configuration program being capable of running on the user's computer, iterating through all open windows on the user's computer to find the custom webpage, obtaining the configuration information from the custom webpage, and configuring the software program using the configuration information obtained from the custom webpage.

An alternative method of automatically configuring software program distributed to a user includes transmitting the software program to the user's computer; obtaining configuration information from the user; generating a custom webpage containing unique identification information and transmitting the custom webpage to the user's computer; providing an automatic configuration program as a part of the software program transmitted to the user's computer, the automatic configuration program being capable of running on the user's computer, iterating through all open windows on the user's computer to find the custom webpage, obtaining the identification information from the custom webpage, and sending a configuration request with the identification information; and in response to receiving a configuration request, transmitting configuration information to the user's computer, wherein the automatic configuration program is further capable of configuring the software program using the configuration information received by the user's computer.

In another aspect, the present invention provides a system for carrying out the method of automatically configuring software, which includes a server computer maintained by the distributor of the software being downloaded, which communicates with a user's computer connected to the server by a network such as the Internet. The server is loaded with software programs that enable it to perform the above described method steps.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
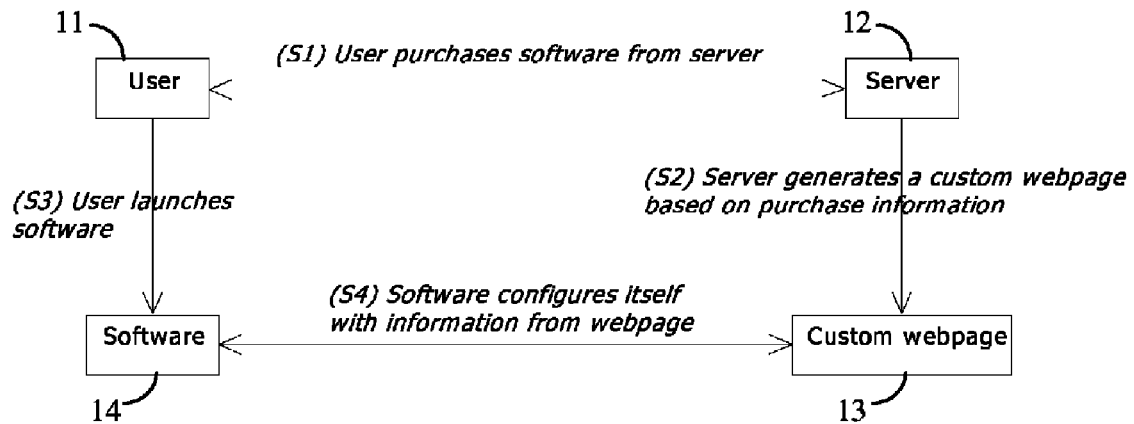
FIG. 1 illustrates a method and system for automatically configuring software according to an embodiment of the present invention.

FIG. 1 illustrates an embodiment of the present invention which provides a method and system for automatically configuring software. First, a user 11 downloads software from a server 12 (step S1). This download process may be a software purchase (license), a free download, or a software download followed by a purchase of a license to use the software that has been previously downloaded for trial, etc. It may also be loading a program from another medium such as a CD, and subsequently purchasing a license from the server. In some instances, the "download" process may occur in different stages and over a period of time. The term "download process" as used in this disclosure is intended to broadly cover any type of software distribution as long as it involves some level of network interaction. During the download process, the user will have voluntarily provided to the server information that can be used to configure the software ("configuration information"), such as the user's name, email address, password, or any other identifier unique to the user. The server's download interface can be designed to gather appropriate configuration information that the software configuration process will need. In step S2, the server generates a custom webpage 13 that contains the gathered configuration information and other information that the server itself generates, such as a customer id number or a license code, and transmits it to the user's computer to be displayed. The webpage may also instruct the user to launch the software program. In step S3, the user launches the downloaded software program, which runs an automatic configuration program 14 on the client-side. In this example, the automatic configuration program 14 is a part of the software program that has been downloaded. Alternatively, it may be a separate configuration program that already exists on the user's computer.

In the configuration step (step S4), the automatic configuration program iterates through all open windows on the user's desktop, until it finds the custom webpage generated in step S2. It then "scrapes" the configuration information from the webpage, and uses it to configure the downloaded software. A preferred implementation is to store the configuration information of step S2 in the window's title rather than window contents, because iterating through titles is faster and easier than iterating through window contents.

Figure 2:
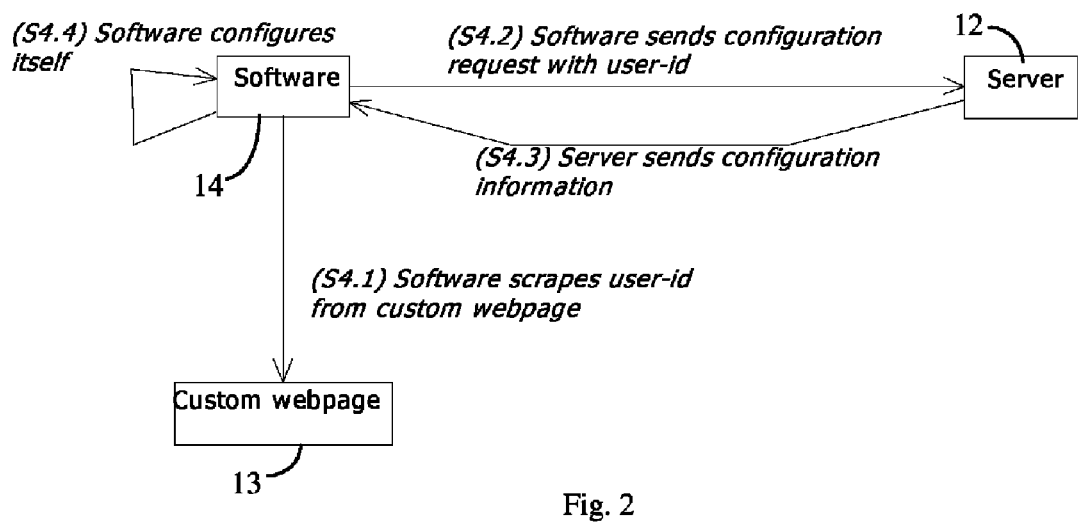
FIG. 2 illustrates a method and system for automatically configuring software according to an alternative embodiment of the present invention.

Alternatively, if there is too much configuration information to fit in a window title, or if some of the configuration information is to be kept confidential and not known to the user, then the window title may contain a unique user-id (it may also contain certain configuration information). In such a case, an "account-redirect" approach is used, and step S4 in FIG. 1 may be expanded to include steps shown in FIG. 2. In step S4.1, the automatic configuration program 14 scrapes user-id from the title of the custom webpage 13. The user-id may be any string or strings such as a user name and password, as long as it uniquely authenticates a user. The automatic configuration program sends a configuration request with the user-id to the server 12 (step S4.2). In response, the server sends configuration information to the program (step S4.3). The automatic configuration program configures the software with the configuration information received from the server (step S4.4). If the webpage title also contains configuration, then such configuration may be scraped and used together with the configuration received from the server to perform the software configuration.

Note that steps S4.2 and S4.3 are not visible to the user, so the configuration information can be hidden from the user. However, the server must store the user's configuration information in its internal database to fulfill the configuration request in step S4.2. Thus, this "account-redirect" scheme requires the server to create an account for every user of the software.

A system for carrying out the method of automatically configuring software includes a server computer maintained by the distributor of the software being downloaded, which communicates with a user's computer connected to the server by a network such as the Internet. The programs running on the server performs the functions of collecting information from the user in the downloading step (step S1), and generating a custom webpage containing configuration information and/or a unique user-id. In the alternative embodiment (FIG. 2), the server programs additionally perform the function of supplying configuration information in response to a request. The user's computer runs a browser program to communicate with the server but is not required to have any other specific software or hardware.

In one specific example, the automatic software configuration method is used in the licensing of a software program. This software is marketed under the shareware model—users can download a free trial version of the software, and if they like it, purchase a license code from the vendor (via the vendor's website) to use the full version. Under conventional software configuration methods, the users would then have to enter their name and license code to license the software and turn the free trial version into a full version. The automatic software configuration method provides an automated way to install the user name and license code into the software, as follows.

First, the user downloads and installs a free trial version of the software. Then, the user buys a license code from the vendor's website, entering the user's name as part of the purchasing process. The vendor's server then generates a custom webpage that contains the user's name and an assigned license code in its title. The webpage also instructs the user to launch the program previously downloaded. When the program is launched, the automatic configuration program is launched. The automatic configuration program iterates through all the browser windows, finds the user's name and the license code in one of its window titles, and scrapes them from the browser window. The automatic configuration program then installs the user's name and license code and notifies the user that it has successfully registered itself. Thus, a generic free trial version of the software can be customized (i.e. licensed) for every user without requiring the user to configure the software him/herself.

The automatic software configuration method described in this disclosure has many advantages. An overall advantage the method is lowered total cost of ownership for software. The method makes it possible to configure software for a user without the user entering the configuration options into the software. Configuration policy can be set by a central authority (at the server) and clients can configure themselves to it. It does not require recompiling or configuring the software for every user. This drastically reduces the software cost and distribution complexity. The method automates the software configuration process as much as possible, requiring minimum amount of input and decision making from the user. This is accomplished by reusing configuration information that the user has already provides, as well as using configuration information that is generated by the server, to configure the software.

A main application of the automatic software configuration method is for distributing and configuring software over the Internet as described above, but the method can also be applied to any client-server context: the configuration options may be entered and stored at the server, and the client may scrape them for the server's output. For example, one could deploy EazyConfigure in a company's private LAN. Employees would download software from a centralized server, and run it to scrape the configuration information from the server's output (whether it be HTML, XML, or any other format). This saves network administrators from configuring each and every employee's computer as each software would just configure itself.

It will be apparent to those skilled in the art that various modification and variations can be made in the automatic software configuration method and system of the present invention without departing from the spirit or scope of the invention. Thus, it is intended that the present invention cover modifications and variations that come within the scope of the appended claims and their equivalents.

What is claimed is:

1. A method for distributing an automatically configurable software program to a user, comprising:

transmitting the configurable software program to the user's computer;

obtaining software configuration information from the user via a browser on the user's computer, the configuration information being unique to the user and being associated with the configurable software program;

generating a custom webpage containing the configuration information obtained from the user and transmitting the generated custom webpage to the user's computer; and providing an automatic configuration program as a part of the configurable software program transmitted to the user's computer, the automatic configuration program being capable of running on the user's computer, iterating through open windows on the user's computer to find the generated custom webpage, obtaining the configuration information from the generated custom webpage, and configuring the configurable software program using the configuration information obtained from the generated custom webpage.

2. The method of claim 1, wherein the generated custom webpage further contains additional configuration information generated by the server.

3. The method of claim 1, wherein the configuration information is contained in a title of the generated custom webpage.

4. A method for distributing an automatically configurable software program to a user, comprising:

transmitting the configurable software program to the user's computer;

obtaining software configuration information from the user via a browser on the user's computer, the configuration information being unique to the user and being associated with the configurable software program;

generating a custom webpage containing identification information unique to the user and transmitting the generated custom webpage to the user's computer;

providing an automatic configuration program as a part of the configurable software program transmitted to the user's computer, the automatic configuration program being capable of running on the user's computer, iterating through open windows on the user's computer to find the generated custom webpage, obtaining the identification information from the generated custom webpage, and sending a configuration request with the identification information; and in response to receiving a configuration request, transmitting configuration information to the user's computer, wherein the automatic configuration program is further capable of configuring the configurable software program using the configuration information received by the user's computer.

5. The method of claim 4, wherein the identification information is contained in a title of the generated custom webpage.

* * * * *